United States Patent [19]

LeCompte

[11] Patent Number: 5,014,930
[45] Date of Patent: May 14, 1991

[54] MISSILE FILAMENT DISPENSING ARRANGEMENT

[75] Inventor: George W. LeCompte, Tucson, Ariz.

[73] Assignee: Hughes Aircraft Company, Los Angeles, Calif.

[21] Appl. No.: 370,526

[22] Filed: Jun. 23, 1989

[51] Int. Cl.$^5$ .............................................. F41G 7/32
[52] U.S. Cl. .................................. 244/3.12; 102/504
[58] Field of Search ....................... 244/3.12; 102/504; 89/1.811

[56] References Cited

U.S. PATENT DOCUMENTS

| 601,604 | 3/1898 | Walsh . | |
|---|---|---|---|
| 3,319,781 | 5/1967 | Simpson et al. | 206/59 |
| 3,613,619 | 10/1971 | DeNobel et al. | 114/21 |
| 4,770,370 | 9/1988 | Pinson | 244/3.12 |

FOREIGN PATENT DOCUMENTS 2144140  3/1973  Fed. Rep. of Germany ..... 244/3.12

*Primary Examiner*—Charles T. Jordan
*Assistant Examiner*—Rochelle Lieberman
*Attorney, Agent, or Firm*—R. M. Heald; C. D. Brown; W. K. Denson-Low

[57] ABSTRACT

A filament (20) for use as a data link is wound on the tapered aft fairing (22) of a missile (10) in a manner so as to form a tapered wound pack (24) conforming generally to the aft fairing. An outer length of the filament is enclosed within a protective covering forming a leader (26). When the missile is launched from a moving mother vehicle (36), a further length of the filament is wound onto a dispenser aboard the mother vehicle (36) and a drogue (30) connected to the leader (26) is released with the leader and filament during dispensing.

5 Claims, 3 Drawing Sheets

MISSILE FILAMENT DISPENSING ARRANGEMENT

BACKGROUND OF THE INVENTION

1. Field of the Invention

The present invention relates generally to a filament data link of a missile or other high speed vehicle and, more particularly, to an improved way of providing a filament pack on such a missile or other high speed vehicle so as to aid aerodynamic streamlining and not expose the filament to undesirable torsion, kinking or tension that could cause reduction in data transmission efficiency or filament breakage.

2. Description of Related Art

Many present day missiles on being launched are interconnected with the launch site by a length of filament via which navigational information is provided throughout a portion of or the entire path of travel. Such filaments, consisting typically of an optical fiber, must be dispensed from a wound pack carried on the missile or vehicle in such manner as not to subject the filament to torsions or excessive tensile forces that would reduce the efficiency of optical signal transmission or, in extreme cases, sever the link completely.

It is generally desirable to make the outer diameter of a wound filament dispenser as large as possible in order to accommodate the required length of filament with as few turns or windings as possible and thereby reduce the possibility of harming the filament. The aerodynamic designer, on the other hand, desires to reduce drag by having a streamlined fairing at the aft end of the craft fuselage. Also, it is important that the outer diameter of a conventionally wound filament bobbin be smaller than the exit passage through which the filament is to be dispensed, otherwise the filament can contact the exit walls which undesirably increases the tensile load on the fiber and would limit filament payout speed. Therefore, even with a full bodied diameter exit, this necessity for clearance within the dispenser shroud reduces the overall permissible winding diameter.

SUMMARY OF THE DISCLOSURE

The filament, e.g. wire or optical fiber, which is to be payed out from a missile or other high speed vehicle is wound into a filament pack on the outside of a missile conical aft fairing providing an overall efficient filament package which is both space and weight efficient and also enhances aerodynamic operation by virtue of its "boattail" construction. By locating the filament pack on the vehicle exterior, the interior, where space is always a premium, has more space available for other equipment.

The outermost filament layer of the package is an armored leader (i.e., filament with a protective covering) which has substantially greater strength for withstanding the relatively high tensile forces experienced by the leader during the initial boost phase. Moreover, the leader is constructed of heat resistant materials able to survive the early portion of the flight when it may be immersed in the exhaust plume of the rocket motor. Still further, the leader overwrap also provides physical protection for the underlying filament against weather and handling environments.

DESCRIPTION OF THE DRAWINGS

In the accompanying drawings

DESCRIPTION OF A PREFERRED EMBODIMENT

Figure 1:
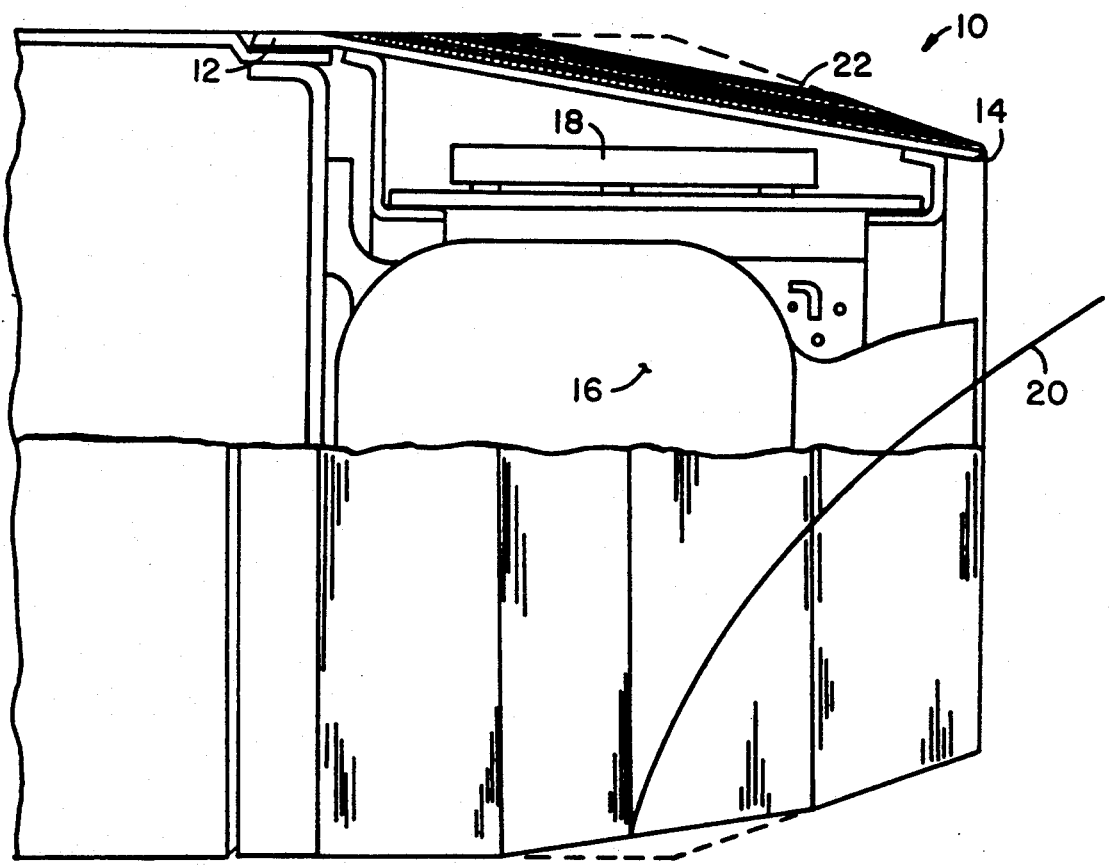
FIG. 1 is a side elevational, partially sectional view taken through the aft portion of a missile showing a filament pack wound thereon in accordance with the present invention.

FIG. 1 of the drawing shows in sectional view the aft end of a missile 10 which is seen to include an outer wall or fairing 12 tapering toward an open end 14. Within the missile there is typically included a rocket motor 16 which in operation emits hot gases outwardly through the open end 14. Among other things, there is also provided a circuit card 18, for example, for receiving navigational information via the data filament link to be described which is used to control missile flight.

A filament 20, which is preferably an optical fiber, is helically wound onto the tapered fairing at 22 and in such manner as to generally conform to the tapered outersurface of the missile. FIG. 1 shows the filament partially payed out (dashed line portion) with most of the layers still wound on the missile fairing.

Figure 3:
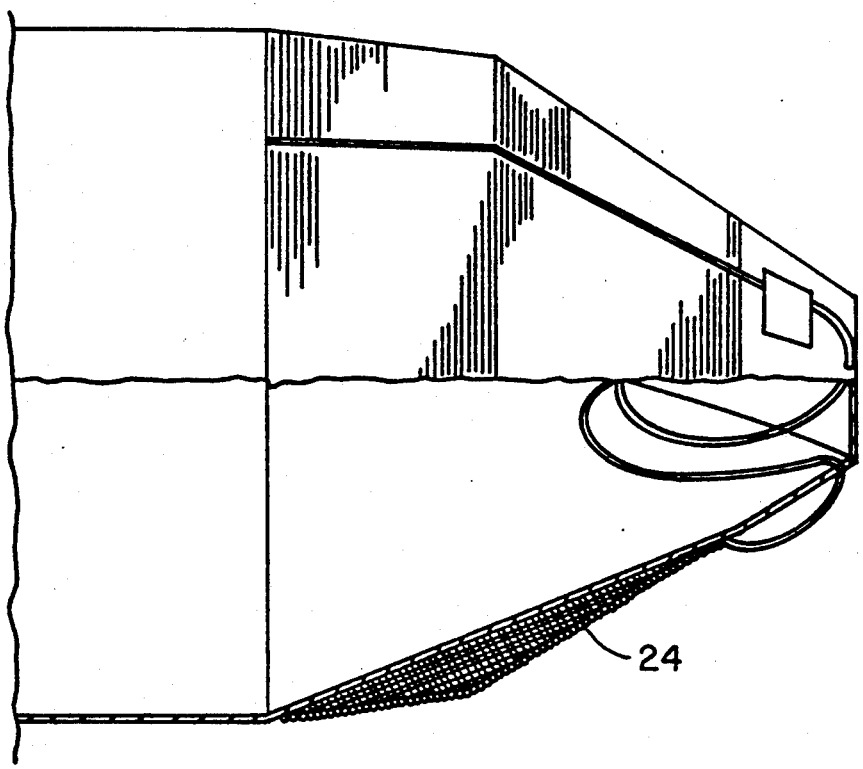
FIG. 3 is an enlarged, partially sectional view of a filament pack wound in accordance with the present invention showing it prior to use.

Turning now to FIG. 3, the upper half of the missile is depicted with a full filament pack 24 wound onto the aft fairing exterior surface and which is particularly contemplated for use when the missile is to be launched from another moving vehicle (i.e., mother vehicle). The outermost end portion of the filament is covered with a protective covering or armor to form a leader 26 which provides a substantial increase in ability to withstand tensile stress as compared with the unprotected filament. The leader is of sufficient length to enable laying down at least one full outer protective layer 28 of leader for the pack which provides physical protection of the underlying filament layers against weather and handling environments. When the missile is to be launched from another moving vehicle, the leader coming from the pack outer layer 28 is affixed to a drogue 30 which is releasably located within the missile closely adjacent the end opening. A further extent 32 of leader 26 extends away from the drogue and is releasably adhered to the missile outer surface in a direction extending substantially parallel to the missile longitudinal axis and continues on to connect with control apparatus on the mother vehicle.

Figure 2:
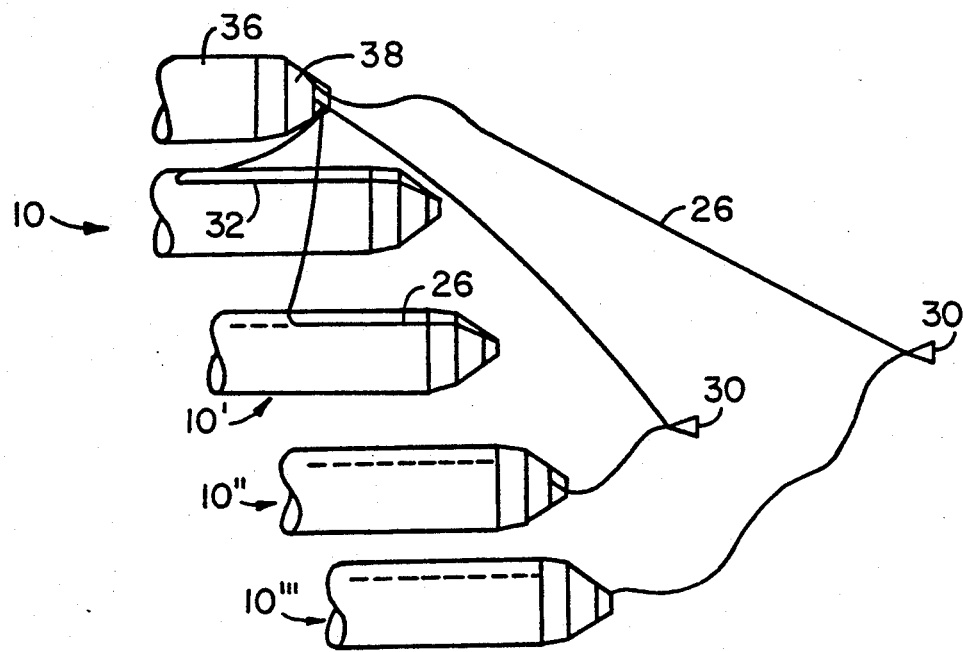
FIG. 2 is a schematic depiction of filament payout from a missile provided with a filament dispensing arrangement of this invention.

For the ensuing description of invention operation reference is made to FIG. 2 where prior to launch the missile 10 is interconnected with a mother vehicle 36 via the leader 26, the filament being wound into the pack 24 on the missile aft fairing as already described. Also, the outer end of the filament can be wound in a pack 38 on the mother vehicle in the same manner as on the missile, or, alternatively, other dispensing apparatus such as an internally located canister, for example, may be used. When launching from a mother vehicle, both ends of the filamentary data link are subjected to tensile forces as the missile separates from mother vehicle and the filament is payed out. For this reason it is advisable to have a filament dispensing means on the mother vehicle as well as the missile as means of reducing the relatively high tensile forces acting on the filament when it is suddenly payed out into an air stream already moving past at high speed.

After launch, as the missile moves away from the mother vehicle to the positions 10' and 10" the leader 26 peels off the missile outer surface. Next, after the leader is completely peeled loose from the missile surface, the drogue 30 is then released (10") and it serves to pull the leader off the missile pack 24 and off the mother vehicle dispensing apparatus. By use of the drogue, the payed out leader followed by the filament without protective covering is extended away from both the missile and mother vehicle which reduces the possibility of entanglement.

Practice of the described invention achieves several beneficial and advantageous results. First of all, since the filament is wound about the missile body the filament pack space does not interfere with other missile apparatus location or space requirements. Secondly, the filament pack diameter is maximized which reduces the number of filament windings and, therefore, reduces the possibility of damaging the filament during payout or reduction of optical signal transmission efficiency. Thirdly, the filament pack arrangement maintains a "boattail" shape at the vehicle aft end enhancing aerodynamic streamlining. Fourthly, filament payout is enhanced by the high speed-air flow over the outermost winding.

The FIG. 1 embodiment differs from the FIG. 3 version in that launch is contemplated as being made from a fixed (e.g., ground based) site rather than from a moving mother vehicle. In this case the drogue is not needed since the missile is powered away from the launch site. Also, it is not necessary to have a further filament dispensing apparatus at the launch site since acceleration of the powered missile at the beginning of launch from a fixed site is substantially less than that experienced by a payed out filament from a moving mother vehicle. Also, in a fixed launch site case, storage protection is provided by a container which acts as the missile launch tube so that an outer layer of leader is not required.

Figure 4:
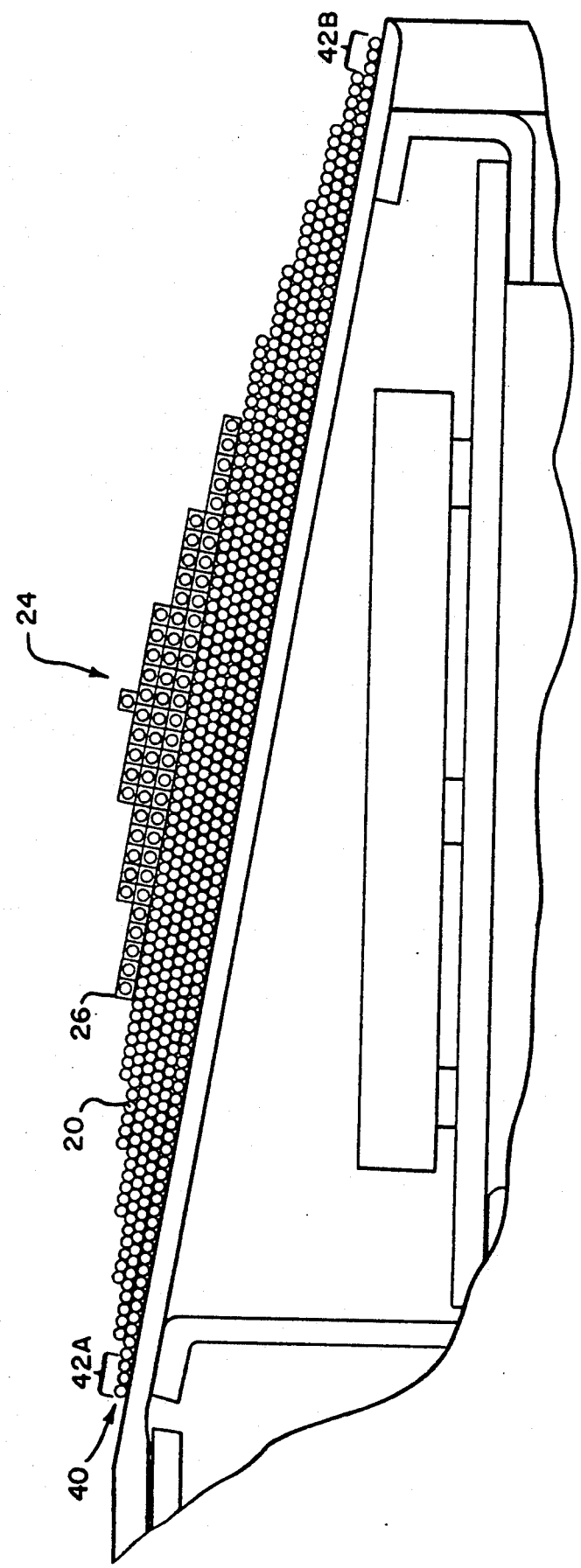
FIG. 4 is an enlarged side elevational sectional view showing filament pack winding details.

For the ensuing description of the filament winding details reference is made especially to FIG. 4. The first winding layer 40 of the pack 24 extends along the tapered fairing from a point just beyond the taper starting point to the missile open end. The second filament layer 42 is stepped back from both ends of layer 40, represented by the letters a and b, respectively. Although in practice there are many more filament layers, only two are shown in FIG. 4. The leader 26 is similarly stepped back from the underlying filament (or leader) layers. The stepping of each layer of filament and leader from the next underlying layer is to maintain the required tapered exterior of the pack 24.

Although the invention has been described in connection with a preferred embodiment, it should be understood that the invention is in no way limited thereby and its scope is to be determined by that of the appended claims.

What is claimed is:

1. Dispensing apparatus for a filament used as data link between a missile having a tapered aft fairing and a mother vehicle from which the missile is launched, comprising:
    means carried by the mother vehicle for dispensing a predetermined length of filament from an end portion thereof;
    a filament pack wound on the missile tapered aft fairing from the other end portion of the filament;
    a protective covering for receipt over the filament other end portion forming a leader; and
    a drogue releasably mounted within the missile and secured to the leader for dispensing along with the leader.

2. Dispensing apparatus as in claim 1, in which the filament is an optical fiber.

3. Dispensing apparatus as in claim 1, in which a portion of the leader is releasably adhered to the outer surface of the filament pack in a line extending transversely of the direction of the filament winding.

4. Dispensing apparatus as in claim 1, in which the leader extends from the missile filament pack to the dispensing means carried by the mother vehicle.

5. Filament dispensing apparatus for a missile having a tapered aft fairing, comprising:
    a length of filament wound about an exterior surface of the tapered aft fairing in a filament pack generally conforming in shape to the tapered aft fairing surface;
    a drogue interconnected to a portion of the filament having a protective covering; whereby
    release of the filament having the protective covering from the pack functions to carry the drogue therewith.

* * * * *